ized coherent light, a first polarization-dependent beam splitter 14 presenting a low impedance optical transmission path to the light 13, an electro-optic light

United States Patent
Schedewie

[15] 3,692,397
[45] Sept. 19, 1972

[54] OPTICAL CHARACTER GENERATOR

[72] Inventor: Franz Schedewie, Boblingen, Germany

[73] Assignee: International Business Machines Corporation, Armonk, N.Y.

[22] Filed: April 12, 1971

[21] Appl. No.: 133,024

[30] Foreign Application Priority Data

July 23, 1970    Germany..........P 20 36 516.6

[52] U.S. Cl.................353/25, 350/150, 350/DIG. 2
[51] Int. Cl..........................G03b 23/00, G02f 1/26
[58] Field of Search............350/150, DIG. 2; 353/25

[56] References Cited

UNITED STATES PATENTS

| 3,220,013 | 11/1965 | Harris | 350/DIG. 2 |
| 3,391,970 | 7/1968 | Sincerbox | 350/DIG. 2 |
| 3,503,670 | 3/1970 | Kosanke et al. | 350/150 |

Primary Examiner—Leonard Forman
Assistant Examiner—Steven L. Stephan
Attorney—Hanifin and Jancin

[57] ABSTRACT

An optical character generator comprises in combination, a source (L) of collimated and polarized coherent light, a first polarization-dependent beam splitter 14 presenting a low impedance optical transmission path to the light 13, an electro-optic light deflector 15 which deflects light transferred to it by the beam splitter, an electro-optic rotator 16 operating selectively to rotate the plane of polarization of light exiting from the deflector, a second low-loss polarization dependent beam splitter 17 having predetermined orientation with respect to light exiting from the rotator, mirrors 18,19 for directing light reflected from second splitter 17 to character mask 20, and source 27 of deflection/polarization control voltages for coordinately operating the deflector 15 and rotator 16. With suitable voltages from the source 27 light 13 undergoes predetermined handling in the deflector and rotator and exits from the rotator with predetermined deflectional displacement and polarization rotation relative to the entering beam 13. The exit polarization plane is rotated by 90° from the entry plane so that the displaced exiting beam is reflected by splitter 17 and mirrors 18, 19 through a predetermined character opening of the character mask and emerges shaped in the character image. The shaped beam impinges upon first splitter 14 and is reflected back into the deflector system due to its positional orientation and polarization state. The shaped re-entrant beam undergoes complementary deflection and polarization switching in the deflector and rotator whereby it exits from the rotator aligned with the path of the original beam 13 and is permitted to pass through the second beam splitter, optics 21 and fixed aperture A of the shutter 22. Thus the single deflector system performs the dual functions of deflecting the unshaped beam and re-centering the shaped beam, with coupling losses minimized by the adaptive use of the low-loss beam splitters.

7 Claims, 3 Drawing Figures

PATENTED SEP 19 1972 3,692,397

INVENTOR
F. SCHEDEWIE

BY Robert Lieber
ATTORNEY

OPTICAL CHARACTER GENERATOR

BACKGROUND OF THE INVENTION

1. Field of the Invention

The invention relates to electro-optic light positioning apparatus and especially to character generation apparatus requiring deflection of a centrally positioned collimated light beam relative to selected opening in a character mask and re-centering of the character shaped light beam passed through the mask opening relative to optic coupling elements having a fixed position.

2. Description Of The Prior Art

Due to the continuously increasing operating speed requirements of modern computers the importance of optical devices has grown considerably, especially in areas where operating speed requirements are beyond the capability of mechanical devices. For instance in high speed printing mechanical designs are approaching limits of speed capability such that further increase of operational speed is possible only by non-mechanical means; e.g., optical printers. In optical printers increased operational speed is possible if electro-optic character generators are used. In such generators character shaped light beams are formed typically by a character mask and dual electro-optic light positioning subsystems with complementary electrical controls. One positioning subsystem deflects an unshaped (cylindrical) collimated beam of light to a character opening in the mask and the other positioning subsystem restores the character shaped beam to a central path aligned with optics coupling to the printing parts of the major system. Since each light deflection subsystem is a technically complex and expensive structure the second subsystem adds considerable cost to this type of character generation equipment.

The literature reference "a high-capacity digital light deflector using Wollaston prisms" by W. J. Tabor in the Bell System Technical Journal, 1967, pages 957 et seq., describes a light deflector arrangement utilizing a single deflection subsystem for off center positioning of a light beam relative to a mask and, by retransmission in the opposite direction through the same deflector, re-centering of the character shaped beam for coupling to other media. However in this arrangement, since the shaped and unshaped beams have coinciding paths within the single deflector subsystem, it is necessary to separate these beams by a high loss beam splitter; for example a standard dielectric beam splitter. Since the beam is handled by this beam splitter twice, once reflected and once transmitted, as much as 75 percent of the original beam energy may be dissipated in the beam splitter. Consequently in printing systems requiring high energy transfer to a photosensitive printing medium such beam splitting losses may be intolerable. Also of note in this type of arrangement is likelihood of distortional interference between the character shaped beam and original beam due to the coinciding optical paths of these beams.

German Pat. No. 1,288,829 describes another character generator in which the beam is deflected and re-centered, after character shaping, by having it traverse coinciding paths in one light deflector in opposite directions. In order to avoid the high losses at initial entrance and final exit a polarization-dependent beam splitter is used. To adapt the beam to reflect off the beam splitter at entrance and pass through it at exit it is passed twice through a Faraday rotator in which its polarization plane is rotated by 45° after the entrance reflection from the beam splitter, and by another 45° in the same sense prior to the exit passage through the beam splitter.

Such rotators for turning the plane of polarization of a beam in the same sense independently of its direction of propagation are, however, very costly and do not show the precision which is required for the majority of applications.

SUMMARY

An object of the present invention is to provide an economical and efficient optical character generator or the like utilizing a single electro-optic light deflector both to deflect and to re-center a beam relative to a character mask or equivalent device, with minimal loss of intensity and image clarity in the re-centered beam.

According to the invention this object is achieved by providing character generator, including a character mask and a light deflector controllably deflecting and re-centering a light beam relative to character openings in the mask, said character generator being characterized by a first polarization-dependent beam splitter, an electro-optic light deflector optically connected at one end with said splitter for controllably deflecting light passing through it according to the position of its direction of polarization, an electro-optic rotator which is optically connected with the other end of the light deflector and by which the polarization plane of a beam leaving said other end of the light deflector is established, independent of its switching state, rotationally displaced by 90° with respect to the plane of polarization of the beam entering the said one end of the light deflector, a second polarization-dependent beam splitter optically connected with the output of the said rotator and oriented in a predetermined direction with respect to the first beam splitter, two reflection elements for guiding the beam deflected by the second beam splitter through a character opening in said mask to the back of the first beam splitter, said reflection elements, together with the first beam splitter directing the character shaped beam formed by said mask character opening back into the said one end of the light deflector at a re-entrance position and with polarization plane complementary to those of the beam passing through the light deflector for the first time, so that the re-entrant beam passes through the light deflector on a path complementary to the path of the first beam and is passed through the rotator and the second polarization-dependent beam splitter, regardless of the switching state of the light deflector, re-aligned with the path of the beam entering the deflector on the first passage.

An embodiment of the inventive idea is characterized in that the polarization-dependent beam splitters consist of Wollaston, Rochon, or Senarmont prisms and/or multi-layer elements.

Another embodiment of the inventive idea is characterized in that the reflecting surfaces of the deflection elements are totally reflecting prism surfaces belonging either to one or to two prisms.

A further embodiment of the invention finally is characterized in that the light deflector consists of several stages comprising each a controllable, electro-optical element for rotating the plane of polarization by 90°, and an element arranged in series thereto which passes on the beam, according to the position of its plane of polarization, on one of two paths.

As the invention allows the use of polarization-dependent beam splitters, these beam splitters involve no losses, contrary to the known arrangements in which losses may amount to 75 percent.

As the high working speeds of optical printers require extremely high light intensities the increase of the degree of efficiency obtained is of major importance.

Figure 1:
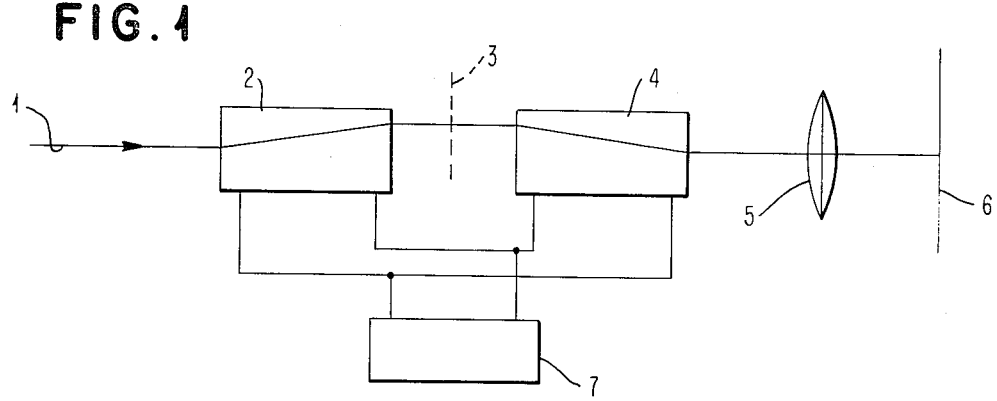
FIGS. 1 and 2 are schematic representations of two prior art electro-optic character generators.

In the prior art arrangement of FIG. 1 a light beam 1 passes through an electro-optic light deflector 2 consisting of several deflection stages which are individually addressable. Such a light deflector is for instance described in U. S. Pat. No. 3,220,013 granted Nov. 23, 1965 to Mr. T. J. Harris. The deflected beam exits from deflector 2 passes through a mask 3 and a second light deflector 4 of the same design as the first light deflector with complementary electrical deflection control, whereby it is re-centered and ultimately imaged by a lens 5 on a record carrier arranged e.g., in an image plane 6.

Electro-optic light deflection systems 2 and 4 are jointly controlled by electrical conditions supplied by a controlling unit 7. The control is such that deflections in deflector 2 are cancelled in deflector 4, whence the exiting beam always impinges on the same spot of image plane 6. Mask 3 consists of an opaque layer in which 8 × 8 characters in the form of transparent apertures are arranged matrix-fashion. For selecting a character control unit 7 effects such a deflection of the beam in deflector 2 that the beam passes through that part of mask 3 which contains the selected character. The beam now shaped in the form of the selected character passes through light deflector 4 which is so energized by control unit 7 that the deflection in the first light deflector is cancelled and the beam is re-centered.

Figure 2:
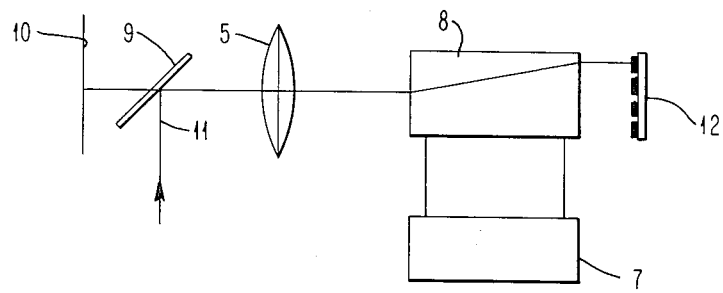

In the prior art arrangement of FIG. 2 a linearly polarized light beam 11 is reflected at a beam splitter 9 and passes through lens 5 and light deflector 8 which is of the same design as the light deflectors 2 and 4 shown in FIG. 1. The individual stages of light deflector 8 are energized by control unit 7 to direct the beam to selected character areas of a mask 12. On this mask, 8 × 8 characters in the form of reflective patterns are arranged, e.g., matrix-fashion. The beam reflected from the mask is shaped in the form of the selected character and, having the same polarization as the incident beam, it re-enters and traverses the light deflector 8 in the opposite direction on the same path as the incident beam. As a consequence of this the character-shaped beam exits from the light deflector 8 always at the same place and with the same direction. Therefore, after passing through lens 5 and beam splitter 9 the shaped beam invariably impinges upon the same spot of image plane 10.

Beams leaving the character shaping arrangements of FIGS. 1 and 2 are directed either to a photosensitive record carrier shiftable from print position to print position, or to another light deflector (not shown) where it undergoes further deflection to a selected spot of a stationary photosensitive record carrier. With the additional deflector the arrangement of FIG. 1 would require a total of three light deflectors and that of FIG. 2 only two light deflectors, but the losses on beam splitter 9 in FIG. 2 may amount to 75 percent of the entering light.

Figure 3:
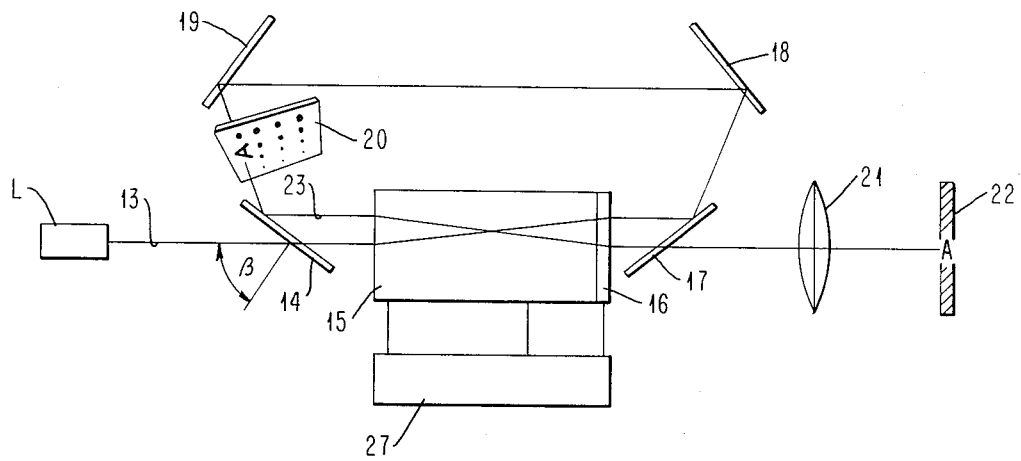
FIG. 3 is the schematic representation of an embodiment of the invention.

In the arrangement shown in FIG. 3 a laser L generates a linearly polarized beam 13 which due to its polarization passes through a polarization-dependent beam splitter 14. This known type of beam splitter consists preferably of multiple layers of material vapor-deposited on a transparent carrier, the layers alternately having high and low indices of refraction index. The beam splitter is adjusted so that the line perpendicular to the plane of incidence forms, with the direction of the impinging light, the Brewster angle B related to the difference of refraction indices of the vapor-deposited layers. The layer thicknesses are selected such that an amplification of the reflected components is obtained by interference. Thus the direction of the plane of polarization of the beam 13 permits its undiminished passage through beam splitter 14.

In the light deflector 15 the beam, according to the switching state of this deflector, is controllably shifted parallel to its entrance position so that it will pass through a selected character aperture of a character mask 20. Coupled to the output of the light deflector is an electro-optic rotator 16 which consists, e.g., of a potassium dihydrogen phosphate (KDP) crystal arranged between two transparent electrodes. Rotator 16 is controlled coordinately with deflector 15 by the electrical control arrangement 27 in such a manner that the beam leaving it, independently of the energization state of light deflector 15, has its plane of polarization rotationally displaced 90° with respect to the plane of polarization of the beam 13 issuing at L.

A second polarization-dependent beam splitter 17, of the same design as beam splitter 14, is situated in the beam path with its direction of polarization parallel to the direction of polarization of beam splitter 14, so that the beam with displaced polarization leaving rotator 16 is reflected at the splitter 17 and then further reflected by mirrors 18, 19 to a selected character aperture of mask 20. The mask contains a matrix of e.g., 8 = 8 character shaped transparent areas, bounded by opaque regions, each area discretely addressable by deflection system 15, 27. Beam 23 leaving mask 20 shaped in the form of the selected character, and having polarization rotationally shifted 90° in respect to the rotation of original beam 13, is reflected by the polarization-dependent beam splitter 14. Thus, beam 23 re-enters light deflector 15 and by virtue of its entrance position and polarization travels a path which is complementary to the path of the original beam.

The character-shaped beam passing through light deflector 15 and rotator 16 for the second time is so polarized, upon leaving rotator 16, that it is passed undiminished through polarization-dependent beam splitter 17 and thereby focused by lens 21 on the fixed space A of image plane 22. From image plane 22 the focused beam is directed, either directly or indirectly through another light deflector system (not shown), to a specific area of a photosensitive printing medium.

It is of course also possible to arrange beam splitters 14 and 17 with relatively perpendicular directions of polarization and to direct the beam transmitted by the second splitter via mirrors to a character mask and back to the light deflector for a second passage. Then the beam reflected by the second splitter would be coupled to the print medium.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. Light beam modifying apparatus for multiply deflecting a beam of polarized collimated light from a predetermined path to a selected entrance position of a beam shaping device and from that device back to an extension of the predetermined path comprising optically connected electro-optic light deflector and polarization rotator units; a source of collimated coherent plane polarized light; a first low-loss polarization-dependent beam splitter positioned to couple light between said source and said deflector unit, whence the light is deflected and passed through the rotator unit, a beam modifying device, means for coupling light through said device to said first beam splitter; a second polarization-dependent low-loss beam splitter positioned to couple light having a first predetermined polarization, relative to the light supplied by said source, between said rotator and said device coupling means; centrally positioned output coupling means positioned to receive light from said second splitter having a second predetermined polarization relative to the source light; and electrical control means coupled to said deflector and rotator units to supply coordinated control voltages to said units designed to produce predetermined selected deflections of light input to the deflection unit and predetermined first and second polarizations of the deflected light with respect to the input light; whereby light supplied by said source is successively deflected in said deflector unit, coupled with modification — via said second splitter, device and first splitter — back into said deflector unit, deflected thence by a deflection displacement equal and opposite to its first deflection; and coupled ultimately to said centrally positioned output coupling means via said second splitter.

2. Apparatus according to claim 1 wherein said device is a mask having transparent character image areas in an opaque background.

3. Apparatus according to claim 1 wherein the said deflector and rotator units are designed to receive, deflect and transfer light with the plane of polarization of the transferred light invariably shifted 90° with respect to the plane of polarization of the received light.

4. Apparatus according to claim 3 wherein the said device is a mask of transparent character images in an opaque background and the said means for coupling light through said device consists of a pair of mirrors.

5. Apparatus according to claim 4 wherein said mirrors are positioned intermediate the mask and said second splitter and the mask has direct optical coupling to said first splitter.

6. Apparatus according to claim 5 wherein the output coupling means includes a character focusing lens and a shutter at the lens focal plane.

7. Apparatus according to claim 4 wherein the deflector unit contains multiple deflection stages each including a sub-stage of selective polarization rotation coupled with a sub-stage of discrete bi-refringent beam positioning of the beam in one of two output paths.

* * * * *